US011279861B2

(12) United States Patent
Carney et al.

(10) Patent No.: US 11,279,861 B2
(45) Date of Patent: Mar. 22, 2022

(54) ADHESIVE COMPOSITIONS BASED ON GRAFTED RESINS

(71) Applicant: LORD Corporation, Cary, NC (US)

(72) Inventors: Brian Carney, Erie, PA (US); Douglas Mowrey, Titusville, PA (US); Paul Wheeler, Erie, PA (US); Rebecca Cowles, Wattsburg, PA (US); Tarek Agag, Erie, PA (US); Brian Perry, Concord Township, OH (US); Andrew Heidenreich, Apex, NC (US); Dodik Kurniawan, Nagoya (JP); Jerry Phelps, Erie, PA (US)

(73) Assignee: LORD Corporation, Cary, NC (US)

( * ) Notice: Subject to any disclaimer, the term of this patent is extended or adjusted under 35 U.S.C. 154(b) by 171 days.

(21) Appl. No.: 16/486,262

(22) PCT Filed: Feb. 20, 2018

(86) PCT No.: PCT/US2018/018685
§ 371 (c)(1),
(2) Date: Aug. 15, 2019

(87) PCT Pub. No.: WO2018/152489
PCT Pub. Date: Aug. 23, 2018

(65) Prior Publication Data
US 2019/0375970 A1 Dec. 12, 2019

Related U.S. Application Data

(60) Provisional application No. 62/460,915, filed on Feb. 20, 2017, provisional application No. 62/460,907, filed on Feb. 20, 2017.

(51) Int. Cl.
*C09J 187/00* (2006.01)
*B29C 45/14* (2006.01)
*B32B 7/12* (2006.01)
*B32B 15/06* (2006.01)
*B32B 15/09* (2006.01)
*B32B 15/18* (2006.01)
*B32B 15/20* (2006.01)
(Continued)

(52) U.S. Cl.
CPC ..... *C09J 187/005* (2013.01); *B29C 45/14311* (2013.01); *B32B 7/12* (2013.01); *B32B 15/06* (2013.01); *B32B 15/09* (2013.01); *B32B 15/18* (2013.01); *B32B 15/20* (2013.01); *B32B 25/08* (2013.01); *B32B 25/20* (2013.01); *B32B 27/36* (2013.01); *B32B 27/365* (2013.01); *B32B 37/1284* (2013.01); *B32B 37/15* (2013.01); *C09J 5/00* (2013.01); *B29C 2045/14868* (2013.01); *B29K 2083/005* (2013.01); *B29K 2667/006* (2013.01); *B32B 2250/02* (2013.01); *B32B 2255/06* (2013.01); *B32B 2255/10* (2013.01); *B32B 2255/26* (2013.01); *B32B 2274/00* (2013.01); *B32B 2305/72* (2013.01); *B32B 2311/24* (2013.01); *B32B 2311/30* (2013.01); *B32B 2319/00* (2013.01); *B32B 2367/00* (2013.01); *B32B 2383/00* (2013.01); *C09J 2451/00* (2013.01); *C09J 2479/02* (2013.01); *C09J 2483/00* (2013.01)

(58) Field of Classification Search
CPC ...... C09J 171/00; C09J 171/03; C09J 171/10; C09J 171/12; C09J 171/14; C09J 151/003; C09J 151/08; C09J 163/00; C09J 163/04; C09J 163/06; C09J 163/08; C09J 163/10; C09J 187/005; C09J 2203/00; C09J 2451/00; C09J 2479/02; C09J 2483/00; C09J 5/00; C09J 5/02; C09J 5/06; B32B 37/15; B32B 37/1284; B32B 2250/02; C08L 63/00; C08L 63/04; C08L 71/00; C08L 71/02; C08L 71/03; C08L 71/10; C08L 71/12; C08L 71/123; C08L 71/126; C08L 71/14
See application file for complete search history.

(56) References Cited

U.S. PATENT DOCUMENTS 4,355,122 A * 10/1982 Fan ................... C08F 283/06
427/386
4,957,677 A   9/1990 Katoh et al.
(Continued)

FOREIGN PATENT DOCUMENTS

CN  101 885 954   11/2010
CN  102 898 983   1/2013
(Continued)

OTHER PUBLICATIONS

Office Action dated Feb. 2, 2021 for Chinese Application No. 2018800127988 with English translation.
Exam Report dated Apr. 28, 2020 for Indian Application No. 201917034317 with English translation.
Hearing Notice dated Mar. 30, 2021 for Indian Application No. 201917034317 with English translation.
(Continued)

*Primary Examiner* — Christopher M Rodd
(74) *Attorney, Agent, or Firm* — Jenkins, Wilson, Taylor & Hunt, P.A.

(57) ABSTRACT

A curable adhesive that is particularly well suited for use in an injection or compression molding operation. The adhesive is based on polymeric resins having carboxylic acid and acrylate ester functionality, such as grafted phenoxy resin, and further constituents such as organic carbonates, blocked isocyanates, catalysts, maleimide compounds, hydride sources, and a carrier fluid. The curable adhesives are particularly well suited for bonding liquid injectable substrates such as liquid silicone rubber, or polyamides to rigid substrates, such as aluminum, stainless steel, or glass.

39 Claims, No Drawings

(51) Int. Cl.

| | | |
|---|---|---|
| *B32B 25/08* | (2006.01) | |
| *B32B 25/20* | (2006.01) | |
| *B32B 27/36* | (2006.01) | |
| *B32B 37/12* | (2006.01) | |
| *B32B 37/15* | (2006.01) | |
| *C09J 5/00* | (2006.01) | |
| *B29K 83/00* | (2006.01) | |
| *B29K 667/00* | (2006.01) | |

(56) References Cited

U.S. PATENT DOCUMENTS

| | | | | |
|---|---|---|---|---|
| 5,266,611 | A | * | 11/1993 | Teschendorf .......... C08L 63/00 428/416 |
| 5,496,886 | A | | 3/1996 | Gourlias |
| 6,034,160 | A | | 3/2000 | Eaton et al. |
| 6,312,801 | B1 | | 11/2001 | Kim et al. |
| 6,426,138 | B1 | | 7/2002 | Narushima et al. |
| 2002/0114891 | A1 | | 8/2002 | Benayoun et al. |
| 2004/0216840 | A1 | | 11/2004 | Kang et al. |
| 2005/0288427 | A1 | | 12/2005 | Jeon et al. |
| 2008/0221232 | A1 | | 9/2008 | Ou et al. |
| 2009/0062421 | A1 | * | 3/2009 | Makino .................. C08L 63/00 522/134 |
| 2010/0272990 | A1 | | 11/2010 | Bondesan et al. |
| 2011/0183566 | A1 | | 7/2011 | Feder et al. |
| 2011/0224593 | A1 | | 9/2011 | Tunius |
| 2013/0148330 | A1 | | 6/2013 | Kim et al. |
| 2017/0114251 | A1 | | 4/2017 | Kanazawa et al. |
| 2019/0375970 | A1 | | 12/2019 | Carney et al. |

FOREIGN PATENT DOCUMENTS

| | | |
|---|---|---|
| CN | 103 396 750 | 11/2013 |
| CN | 105 338 220 A | 2/2016 |
| DE | 3811832 | 10/1988 |
| JP | H07242714 A | 9/1995 |
| JP | 2000026826 A | 1/2000 |
| JP | 2010019922 A | 1/2010 |
| JP | 2018532838 A | 11/2018 |
| KR | 10-2004-0090156 | 10/2004 |
| WO | 2010/054287 | 5/2010 |
| WO | 2010/027041 | 2/2012 |
| WO | WO 2014/155509 A1 | 10/2014 |
| WO | 2014/081003 | 1/2017 |
| WO | 2017/168001 | 10/2017 |
| WO | WO 2018/152489 A1 | 8/2018 |

OTHER PUBLICATIONS

International Search Report and Written Opinion dated May 3, 2018 for International Application No. PCT/US2018/018685.
International Preliminary Report on Patentability dated Aug. 20, 2019 for International Application No. PCT/US2018/018685.
Examination Report dated May 13, 2020 for European Application No. 18708036.1.
Examination Report dated Nov. 18, 2020 for European Application No. 18708036.1.
Korean Office Action dated Dec. 10, 2021 for Korean Application No. 10-2019-7026209.
Japenese Notice of Rejection dated Feb. 2, 2021 for Japanese Patent Application No. 2019-545325.
Japanese Office Action for Application No. 2019545325 dated Sep. 23, 2020.
Ulrich, Henri, "Novel Masked Aliphatice Diisocyanates," ACS Symposium Series, vol. 172, p. 519, (1981).
Sherwood, Phillip, "Bis Cyclic Urea Compounds as Masked Aliphatic Isocyanate Curing Agents for Baking Enamels", Journal of Coatings Technology, vol. 54, No. 689, pp. 63-68, (1982).
Park, Chang-Man et al., "Phtallic Acids and Other Benzenepolycarboxylic Acids", Kirk-Othmer Encyclopedia of Chemical Technology, Third Edition, vol. 23, p. 584 (2020).
Chinese Search Report for Application No. 201880012798 dated Jun. 4, 2021.
Chinese Office Action for Application No. 20188012798 dated Jun. 28, 2021.

\* cited by examiner

ADHESIVE COMPOSITIONS BASED ON GRAFTED RESINS

CROSS REFERENCE TO RELATED APPLICATIONS

The present application claims priority under 35 U.S.C. § 119(e) from U.S. Provisional Patent Application Ser. No. 62/460,907 filed Feb. 20, 2017, entitled "ADHESIVE COMPOSITION BASED ON GRAFTED PHENOXY RESINS", and U.S. Provisional Patent Application Ser. No. 62/460,915 filed Feb. 20, 2017, entitled "BENZOXAZINE RESIN BASED ADHESIVE", the disclosures of which are incorporated herein by reference.

FIELD OF THE INVENTION

The invention relates to an adhesive composition and related methods particularly suitable for injection or compression molding operations, preferably those bonding silicone elastomers such as liquid silicone rubber (LSR) to polycarbonate, other plastics, metals, and other rigid substrates.

BACKGROUND OF THE INVENTION

The unique performance of silicon rubbers (silicones) is attributed to the strong silicon-oxygen chemical bond as a repeating unit on its chemical structure. They are odorless, tasteless, do not support bacterial growth and do not stain or corrode other materials. It has outstanding chemical resistance against oxidation and many chemicals, including some acids, alkali solutions, solvents, oils and fuels and water. Silicones withstand a wider range of temperature extremes than most other elastomers. They also have excellent insulating properties as well as flexibility in electrical applications.

One of the commonly used of silicones is an addition-cured liquid silicone rubber (LSR) which is typically provided as a 2-part composition, one containing vinylated silicon polymer and a platinum (Pt) catalyst, and vinylated silicon polymer and Si—H oligomer in the other. Both are mixed just before use, followed by heating for vulcanization at high temperature. Another form of silicone is referred to as HCR (high consistency rubber). In this form, a platinum catalyst, via a two-roll mill, is added to a high viscosity silicone matrix containing hydrosilane and vinyl groups.

Molding addition-cured silicone onto a thermoplastic substrate, particularly polycarbonate, polyester, and polyamide, results in multi material design and performance that combines the best attributes of both substrates. However, it is not an easy task to get robust adhesion of cured silicone to plastics because of low surface energy and lack of functional groups. Therefore, it is necessary to change or improve the surface properties of the plastic without altering the bulk properties. Several techniques are used to modify the surface for improved adhesion, including plasma treatment, mechanical or chemical treatment, and exposure to flames, photons or ion beams. Among these techniques, plasma treatment is a commonly used method to improve the wettability and adhesion. Such treatment leads to surface oxidization, increasing its surface energy and creating roughness. However, there are performance reproducibility issues associated with the use of plasma treatment. Additionally, even the aforementioned surface treatment techniques do not yield a surface that will covalently bond to silicone.

Recent advances in adhesive formulations have provided robust bonds between liquid silicone rubber and rigid substrates in compression and injection molding operations. These adhesives can be modified to bond a variety of silicone rubber formulations to a variety of rigid substrates including polycarbonate, polyamide, metals and other rigid substrates.

Prior LSR adhesives based on phenoxy polymers were effective in bonding low-temperature LSR materials, but were less effective for high-temperature LSRs or in solvent-based formulations. Additionally, it would be desirable to provide an adhesive capable of bonding a number of elastomers and thermoplastics to rigid substrates in injection and compression molding operations.

It is to these perceived needs that the present invention is directed.

SUMMARY OF THE INVENTION

The adhesives described herein are particularly useful to bond two dissimilar substrates in compression and injection molding processes. For this reason, one substrate will commonly be referred to as the "liquid introduced substrate" and the other substrate will commonly be referred to as the "rigid substrate". As such, the liquid introduced substrate is not necessarily a "liquid" but rather the conformable/deformable substrate that is introduced into the molding chamber, in contrast to the solid substrate which is remains relatively dimensionally stable during the molding operation. In an embodiment of the present invention employing an injection molding operation, the liquid introduced substrate will be a flowable liquid, such as a liquid silicone rubber. However, in embodiments of the invention employing a compression molding operation, the liquid introduced substrate may be a sold, but is compressed/deformed during the molding process to engage the solid substrate, with an adhesive disposed at least partially there between. Examples of liquid introduced substrates include liquid silicone rubber, polybutylene terephthalate (PBT), thermoplastic urethanes, castable urethanes and the like. Adhesives of certain embodiments of the present invention are particularly well suited for bonding peroxide cured elastomers, such as hydrogenated nitrile butadiene rubber (HNBR), ethylene propylene diene monomer rubber (EPDM), fluoroelastomers (FKM), and fluorosilicones (FVMQ). Examples of rigid substrates include metals such as stainless steel and aluminum, polyamide, polycarbonate, and other rigid plastics.

In an embodiment of the present invention, a class of adhesives based on polymers comprising carboxylic acid and acrylic ester functionality are provided that obviate the need for surface treatment on plastic substrates and bond exceptionally well to metals. These adhesives are effective on a larger variety of liquid silicone rubbers and other injectable substrates than previous adhesive systems. Further the effectiveness on both low temperature and high temperature curing LSRs, as well as peroxide cured elastomers is well demonstrated.

In one embodiment of the present invention, a curable adhesive is provided comprising a grafted phenoxy resin, an organic carbonate, and a solvent, wherein the grafted phenoxy resin comprises carboxylic acid and acrylate ester functionality. The carboxylic acid functionality comprises a —COOH moiety, and the acrylate ester functionality comprises a —COOCH3 moiety.

In another embodiment of the present invention, the curable adhesive further comprises an isocyanate, preferably a blocked isocyanate, and most preferably a MDI-uretdione.

In a further embodiment of the present invention, the adhesive is provided in two parts wherein the grafted resin is provided in a first part separate from a catalyst provided in the second part.

In another embodiment of the present invention, the curable adhesive is employed to bond a liquid-introduced substrate to a rigid substrate as noted above.

In a further embodiment of the present invention, a bonded assembly is provided comprising a liquid introduced substrate bonded to a rigid substrate with a curable adhesive comprising a phenoxy polymer comprising carboxylic acid and acrylate ester functionality.

In another embodiment of the present invention, a method of bonding two dissimilar materials in an injection or compression molding process is provided comprising: selecting a rigid substrate, selecting a liquid introduced substrate, and providing a curable adhesive comprising a polymeric resin comprising carboxylic acid functionality and acrylate ester functionality.

In yet another embodiment of the present invention, a method of preparing an adhesive is provided comprising: reacting a polymeric resin with at least one of methyl methacrylate, butyl acrylate, hydroxyl ethyl methacrylate, phenoxy ethyl acrylate, butyl acrylate, ethyl acrylate, hydroxyethyl acrylate, or mono-methacryloxypropyl terminated polydimethylsiloxane, and at least one of methacrylic acid, maleic anhydride, or itaconic acid, to produce a grafted phenoxy resin comprising carboxylic acid functionality and acrylate ester functionality, and then mixing the polymeric resin with at least one of an organic carbonate, a blocked isocyanate, a maleimide compound, or a benzoxazine resin to produce an adhesive.

The curable adhesives in an embodiment of the present invention are easy to apply in a variety of ways (spray, dip, brush), and work exceptionally well in high humidity and high heat environments where the current industry standard (based on silanes) fails. Additionally, unlike adhesives based on unmodified phenoxy resins, the adhesives of the present invention provide robust bonding across a wide range of LSRs and rigid substrates.

In another embodiment of the present invention, an adhesive is provided that bonds to low temperature cured LSRs without a crosslinking system, as previously thought to be required. This demonstrates that the highly grafted polymer is adding an extra dimension of diffusion and hydrogen bonding capabilities to the adhesive systems not seen with previous phenoxy polymers.

An increase in molecular weight and potential crosslink density is also helping environmental performance. The higher amount of hydroxyl groups not only increase hydrogen bonding sites, but also provide a large increase in functional sites for crosslinking with any chemistry that will react with a hydroxyl group.

In an additional embodiment of the present invention, the adhesive further comprises a uretdione, preferably a uretdione of MDI, to crosslink the system at higher curing temperatures. The uretdione does not activate until higher temperatures are reached and is therefore not advantageous for low temperature cure conditions.

So overall, with the addition of the grafted polymer we see improvements in wetting of the substrates and adsorption through hydrogen bonding and dispersive forces. We also see a higher functionality, increasing bonding parameters, crosslink density, and diffusive forces for bonding a greater variety of LSRs. This is also contributing to greater overall performance in environmental testing.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

DETAILED DESCRIPTION OF THE INVENTION

In a first embodiment of the present invention, a curable adhesive is provided based on a polymeric resin grafted with carboxylic acid and acrylate ester functionality. Typically, these moieties are grafted on the polymeric resin. The carboxylic acid functionality enhances bonding to the rigid substrate and adds the availability of a crosslinking site for future reactions in particular with hydride functional components either in the adhesive or in the liquid introduced substrate, such as a liquid silicone rubber. The acrylate ester plays an important role in helping the polymer chains diffuse into the liquid introduced substrate, such LSR during the bonding process, this allows for physical entanglements and the possibility of future covalent boding activity as outlined above.

In a preferred embodiment of the present invention the polymeric resin comprises a phenoxy resin. Phenoxy reins are commercially important thermoplastic polymers derived from bisphenols and epichlorohydrin. Their molecular weights are higher, i.e., at least about 45,000, than those of conventional epoxy resins, i.e., 8,000 maximum. They lack terminal epoxide functionality and are therefore thermally stable and can be fabricated by conventional thermoforming techniques. Phenoxy resins are prepared by reaction of high purity bisphenol A with epichlorohydrin in a 1:1 mole ratio. Solution polymerization may be employed to achieve the molecular weight and processability needed.

Phenoxy resins are preferred, in part, due to hydroxyl moieties on the backbone of the resin. These hydroxyl moieties are thought to provide increased chemisorption at the substrate interface (plastic or metal) in the form of hydrogen bonding and dispersive forces, in addition to allowing for increased diffusion across the elastomer or liquid plastic interface providing ample opportunities for covalent bonding in the form of crosslinking and entanglement during a curing process.

In a preferred embodiment of the present invention, the modified phenoxy resin comprises a phenoxy resin grafted with methacrylic acid (MAA) and methyl methacrylate (MMA). Grafting these moieties on the phenoxy resin increases the molecular weight of the polymer and provides additional functionality. A suitable example of a phenoxy resin that may be used in the present invention is a polymer of bisphenol "A", specifically, diglycidyl ethers of bisphenol "A", that has had carboxylic acid and methyl methacrylate grafted thereto.

In another embodiment of the present invention, any solvent-soluble phenoxy resin may be modified with methacrylic acid and methyl methacrylate for use in an adhesive. Solvent-soluble phenoxy resins are known in the art from a number of producers, however particularly suitable examples of phenoxy resins for solvent-based adhesives include the solid PKHH grade sold by Phenoxy Associates or PKHS-40, which is a PKHH grade pre-dissolved in methylethyl ketone (MEK).

In a most preferred embodiment of the present invention, the phenoxy polymer of the present invention is heavily grafted to the extent that the molecular weight has been doubled from about 50,000 to about 100,000.

In another embodiment of the present invention, the polymer resin comprises at least one of polyvinyl butyral, bisphenol A, or bisphenol F epoxies or combinations thereof. The carboxylic acid and acrylate ester functionalities may then be grafted thereon as described herein.

In a further embodiment of the present invention, the polymer resin itself comprises carboxylic acid and acrylate ester functionality, such as a copolymer of methacrylic acid an acrylate ester, preferably ethyl acrylate.

In an embodiment of the present invention, the carboxylic acid functionality is introduced by grafting a moiety onto the polymer comprising at least one of methacrylic acid, maleic anhydride, formic acid, acetic acid, propionic acid, butyric acid, pentanoic acid or hexanoic acid. In another embodiment of the present invention, the acrylate ester functionality is introduced by grafting a moiety onto the polymer comprising methyl methacrylate, ethyl acrylate, hydroxy ethyl acrylate, hydroxy ethyl methacrylate, phenoxy ethyl acrylate, butyl acrylate and related higher esters. An example of a suitable grafting process employing methyl methacrylate and methacrylic acid is described in U.S. Pat. No. 6,034,160, in particular in Example 1 thereof, and illustrated in the reaction scheme (I) below:

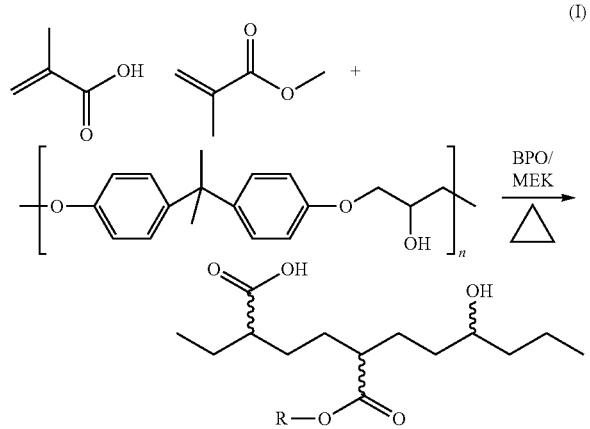
(I)

In reaction scheme I, the representative grafted polymer comprises chains comprising carboxyl groups and chains comprising acrylate ester groups in addition to chains comprising hydroxyl groups on the backbone.

With the grafted carboxylic acid and acrylate ester groups, this opens the door to all types of crosslinking chemistry available to these groups. For example reactions with isocyanates, methylol, silanol, amine, bases, epoxy (as a curative), aldehydes, condensation reactions, esterification/transesterification reactions, strong interactions with any hydrogen bonding compounds, strong chemisorption bonds formed on metals, reactions with polyamides, polycarbonates, etc. . . . . . In particular we mention the very quick reactions with isocyanate functionality for quick crosslinking in injection molding processes.

In one embodiment of the present invention, the grafted resin is present in an amount up to about 90 weight percent of the dried adhesive (i.e. after application to a substrate and any solvent/carrier is evaporated). In another embodiment of the present invention, the grafted resin is present as a substantial or majority component, typically between about 40 and about 70 weight percent of the dried adhesive, or more precisely about 50 to about 65 weight percent of the dried adhesive.

In one embodiment of the present invention, an organic carbonate is provided in the adhesive formulation. In a particularly preferred embodiment, the organic carbonate comprises propylene carbonate. While not wishing to be bound by the theory, it is believed that propylene carbonate plays a pivotal role in bonding, most likely carrying the polymer into the LSR through diffusion.

Examples of other such carbonates include dimethyl carbonate, diethyl carbonate, dipropyl carbonate, dibutyl carbonate, dipentylcarbonate, dihexyl carbonate, dioctyl carbonate, diphenyl carbonate, diallyl carbonate, ditolyl carbonate, butyl phenylcarbonate, 1,3-dioxolan-2-one (ethylene carbonate), 4-methyl-1,3-dioxolan-2-one (propylene carbonate), 4-ethyl-1,3-dioxolan-2-one (butylene carbonate), 4-propyl-1,3-dioxolan-2-one, 4-vinyl-1,3-dioxolan-2-one, 1,3-dioxan-2-one (trimethylenecarbonate), 5-dimethyl-1,3-dioxan-2-one (neopentylene carbonate), 4-methoxymethyl-1,3-dioxolan-2-one, 4-ethoxymethyl-1,3-dioxolan-2-one, 4-phenoxy-methyl-1,3-dioxolan-2-one, 4-acetoxymethyl-1,3-dioxolan-2-one, erythritol bis(carbonate) and 2,5-dioxahexanoate.

The organic carbonates used are preferably ones having a cyclic structure such as 1,3-dioxolan-2-one (ethylene carbonate), 4-methyl-1,3-dioxolan-2-one (propylene carbonate), 4-ethyl-1,3-dioxolan-2-one (butylene carbonate) or glycerol carbonates in which the 0-bonded hydrogen of the exocyclic —CH$_2$OH group has been replaced by NCO-unreactive substituents such as optionally substituted alkyl, acyl, aryl or aralkyl groups.

In an alternate embodiment of the present invention, a cyclic sulfone or sulfolane material may be employed to perform the function of the previously-described organic carbonate. However, the cyclic sulfone may interfere with the embodiments employing a platinum catalyst, and therefore is preferred only in non-catalyzed adhesive embodiments.

In one embodiment of the present invention, the organic carbonate is present in an amount up to about 65 weight percent of the dried adhesive, and more precisely about 20 to about 50 weight percent of the dried adhesive.

In one embodiment of the present invention, the adhesive further comprises a blocked isocyanate, preferably a self-blocked isocyanate. Self-blocked isocyanates are also referred to as internally-blocked isocyanates and commonly comprise dimerized diisocyanates.

Bis (cyclic ureas) are blocked aliphatic diisocyanates and are preferred in some embodiments because no by-products are formed upon thermal release of the reactive isocyanate groups. These comprise compounds that can be referred to as self-blocked isocyanates. Examples of these bis-cyclic ureas are described by Ulrich, ACS Symp. Ser. 172 519 (1981), Sherwood, J. Coat. Technol. 54 (689), 61 (1982) and Kirk-Othmer Encyclopedia of Chemical Technology, Third Edition, Volume 23, p. 584 all of which are incorporated herein by reference. As an example of such an internally-blocked isocyanate, uretdione-bound self-blocked isophorone diisocyanate, which is marketed from Huls Co. under a tradename "IPDI-BF 1540", may be cited.

In a less preferred embodiment of the present invention, the self-blocked isocyanates comprise the dimerized diisocyanates discussed above, however there may be some isocyanate functionalities on the ends of the molecule that are partially blocked or unblocked. These functionalities may react slowly with water and decrease shelf life in aqueous formulations, however the primary "internally blocked" isocyanate functionality remains reactive in the as-applied adhesive formulation and is available for bonding.

In one embodiment of the present invention, the self-blocked isocyanate comprises dimeric isocyanates such as dimeric toluene diisocyanate (TDI-uretdione), dimeric methylene diphenyl diisocyanate (MDI-uretdione) or a mixture thereof. An example of a uretdione of MDI is GRIL-BOND A2BOND available from EMS-Griltech (Switzerland), and an example of a uretdione of TDI is ADOLINK TT available from Rhein Chemie Rheinau GmBH (Mannheim, Germany).

In an additional embodiment of the present invention, the isocyanate comprises a traditional blocked isocyanate. Blocked isocyanates are typically formed by the reaction of an isocyanate with either an active hydrogen or methylene compound such as malonic esters. When these blocked products are heated, the blocking agent is released and the isocyanate reacts when in the presence of an isocyanate-reactive species such as a phenoxy resin.

In one embodiment of the present invention, the blocked isocyanate is present in the adhesive in a minority amount, such as less than about 15 weight percent, and more precisely less than about 10 weight percent of the dried adhesive.

In another embodiment of the present invention, the adhesive further comprises a maleimide compound. Maleimide containing adhesives of this embodiment are particularly useful for bonding peroxide cured adhesives. The maleimide compound comprises any compound containing at least two maleimide groups. The maleimide groups may be attached to one another or may be joined to and separated by an intervening divalent radical such as alkylene, cycloalkylene, epoxydimethylene, phenylene (all 3 isomers), 2,6-dimethylene-4-alkylphenol, or sulfonyl. An example of a maleimide compound wherein the maleimide groups are attached to a phenylene radical is m-phenylene bismaleimide and is available as HVA-2 from E.I. Du Pont de Nemours & Co. (Delaware, U.S.A.).

The maleimide compound crosslinker may also be an aromatic polymaleimide compound. Aromatic polymaleimides having from about 2 to 100 aromatic nuclei wherein no more than one maleimide group is directly attached to each adjacent aromatic ring are preferred. Such aromatic polymaleimides are common materials of commerce and are sold under different trade names by different companies, such as BMI-M-20 and BMI-S aromatic polymaleimides supplied by Mitsui Chemicals, Incorporated.

In one embodiment of the present invention, the maleimide compound is present in the adhesive in a minority amount, such as less than about 15 weight percent, and more precisely less than about 10 weight percent of the dried adhesive.

In one embodiment of the present invention, the adhesive further comprises a catalyst. The catalyst comprises a typical metal hydrosilylation catalyst and used in an amount specified below which is sufficient to effect the cure of the adhesive composition. In a preferred embodiment of the present invention, the catalyst comprises a platinum cyclovinylmethylsiloxane complex. An additional suitable platinum catalyst is available from Gelest, Inc. under the SIP 6830 designation, also known as Karstedt Catalyst, or a COD catalyst such as dichloro(1,5-cyclooctadiene)platinum (II), available from Sigma-Aldrich, Missouri, USA.

In another embodiment of the present invention, suitable catalysts include but are not limited to chloroplatinic acid, Karstedt's catalyst (Pt2{[CH$_2$=CH)Me2Si]2O}3), Ashby's catalyst {[(CH$_2$=CH)MeSiO]4}3Pt, Wilkinson's catalyst [tris(triphenylphosphine)rhodium (I) chloride], polymer bound Wilkinson's catalyst, tris(triphenylphosphine)iridium (I) chloride, chloroplatinic acid/octanol complex, platinum cyclovinylmethylsiloxane complex (Ashby-Karstedt catalyst), platinum carbonyl cyclovinylmethylsiloxane complex, bis(benzonitrile)dichlorpalladium (II), tetrakis(triphenylphosphine)palladium (0), palladium 2,4-pentanedionate, iridium 2,4-pentanedionate, iridium cyclooctadiene chloride, Pt metal, Pd metal, Ir metal, and Rh metal.

In a further embodiment of the present invention, an adhesive is provided that excludes platinum catalysts from the formulation. In this embodiment, a polymer comprising carboxylic acid and acrylate ester functionality is combined with a hydride source, a non-platinum containing catalyst, and optionally an organic carbonate. The hydride source comprises a hydrosilane, such as trichlorosilane, trifluorosilane, dimethylsilane, triethylsilane, triphenylsilane, diphenylsilane, phenylsilane, tris(trimethylsilyl)silane, phenylmethylsilane, and the like. In another embodiment of the present invention, non-silane based hydride sources may be employed, particularly when the liquid introduced substrate does to comprise a silicone material. It is believed that the hydride source provides crosslinking into both the adhesive as well as the liquid substrate, particularly when the liquid substrate comprises a silicone material. In a preferred embodiment of the present invention, the hydride source comprises polymethylhydrosiloxane.

In another aspect of the present invention, it has been found that improved performance can be obtained by employing one or more non-platinum containing catalysts. While typically employed in embodiments where a catalyst is present in the adhesive formulation, co-catalysts may also be employed in adhesive formulations without a primary catalyst, i.e. no platinum based catalysts. These co-catalysts are preferable based on the elements from Groups VIIB, VIII, IB, IIB, IVA or VA of the Periodic Table of the Elements such as manganese, cobalt, nickel, copper, zinc, zirconium germanium, antimony, or bismuth, especially compounds based on an element from the foregoing groups metals, such as bivalent metals, and particularly chelates of metals, or oxides or salts of these metals and especially carbonate salts are preferred. Zinc, bismuth, and antimony are especially preferred metallic elements, with zinc being most preferred.

Representative salts of these cocatalyst metals are based on inorganic acids, carboxylic acids, hydroxy carboxylic acids, alcohols, glycols and phenols.

Representative carboxylic acids include both mono and dicarboxylic acids containing from 1 to about 20 carbon atoms and include aliphatic and cycloaliphatic saturated or unsaturated acids, and aromatic acids, and include formic, acetic, acrylic, methacrylic, propionic, butyric, hexanoic, octanoic, decanoic, stearic, oleic, eiconsanoic and benzoic acids. Examples of dicarboxylic acids include oxalic, malic, maleic, succinic, sebacic and the various isomeric phthalic acids. Typical hydroxy carboxylic acids preferably contain from 2 to about 20 carbon atoms and include hydroxy acetic, lactic, citric, tartaric, salicylic, and gluconic acids.

Inorganic acids or the mineral acids include carbonic acid, halogen acids such as hydrochloric, hydrobromic, and hydriodic acids, nitrogen acids, sulfur acids and phosphorus acids, all of which are known in the art.

The alcohols comprise straight chain or branched chain mono- or polyhydroxy alcohols, alkyl substituted or unsubstituted mononuclear or polynuclear mono or polyhydroxy cycloaliphatic alcohols and the like containing from 1 to about 20 carbon atoms. The phenols comprise alkyl substituted or unsubstituted mononuclear or polynuclear mono or polyhydroxy phenols.

The carbonates of the aforesaid metals may exist as pure carbonates or as basic carbonates which are believed to be mixtures of the carbonate and the oxide or hydroxide of the metal in a single molecule and include metal carbonates such as basic zinc carbonate, basic copper carbonate and the like.

The chelates of the aforesaid metals that may be employed may be based on any metal chelating compounds known in the art but typically comprise beta-diketones such as acetyl acetone to provide the acetylacetonates of the metals.

Metal catalysts that are generally most suitable as cocatalysts are the ones that are soluble in the formulation especially if soluble in the functional compound, e.g. the polyol resin or soluble in the solvent if the formulation uses a solvent.

Some specific metal catalysts that may be employed comprise zinc carbonate (basic), zinc acetylacetonate, zinc acetate, copper acetylacetonate, iron acetylacetonate, nickel acetylacetonate, zinc acetate, zinc lactate, and copper acetate. Such suitable metal cocatalysts are generally described by Leiner and Bossert in U.S. Pat. No. 4,395,528.

In an additional embodiment of the present invention, other zinc salts may be employed such as zinc nitrate, zinc chlorate, zinc sulfate, zinc phosphate, zinc molybdate, zinc chromate, zinc arsenite, zinc arsenate octahydrate, zinc citrate, zinc diacrylate, zinc dimethacrylate, zinc octoate, and zinc oxide, and the like.

In another embodiment of the present invention, the adhesive further comprises a benzoxazine resin. Benzoxazine is composed of an oxazine ring, a heterocyclic aromatic six-membered ring with oxygen and nitrogen, attached to a benzene ring. There are several benzoxazine derivatives depending on the position of the oxygen and nitrogen in the ring. Benzoxazine resin offers tremendous performance and outstanding thermal stability as well as excellent adhesion characteristics to various substrates, including plastics and metals.

In a preferred embodiment of the present invention, the benzoxazine comprises the oxygen and nitrogen in a 1,3 configuration in the 6 membered ring. In a more preferred embodiment of the present invention, the benzoxazine comprises a bisphenol or diameine-based benzoxazine in accordance with the structures below.

Bisphenol-Based Benzoxazine:

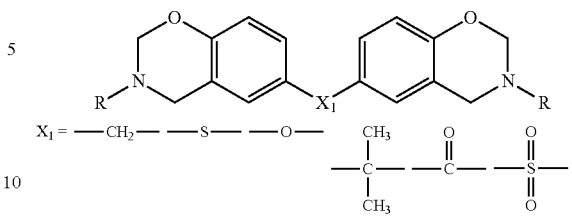

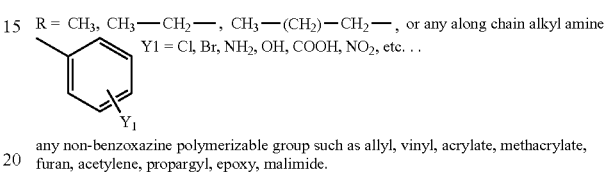

any non-benzoxazine polymerizable group such as allyl, vinyl, acrylate, methacrylate, furan, acetylene, propargyl, epoxy, malimide.

Diamine-Based Benzoxazines:

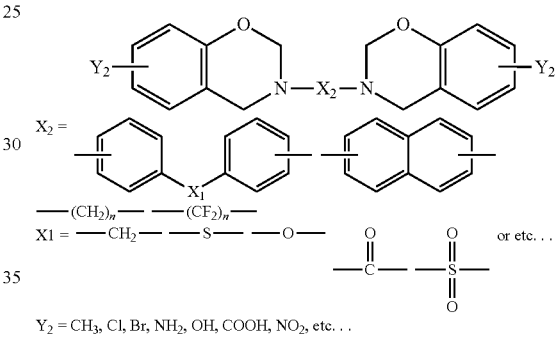

$Y_2$ = $CH_3$, Cl, Br, $NH_2$, OH, COOH, $NO_2$, etc. . .

In another embodiment of the present invention, a curative for the benzoxazine resin is provided. In a most preferred embodiment of the present invention, the curative comprises an amine salt of trifluoromethanesulfonic acid. Since the benzoxazine can crosslink with the grafted phenoxy resin, a separate catalyst for the phenoxy resin is not necessary.

In one embodiment of the present invention, the benzoxazine compound is present in the adhesive in an amount less than about 40 weight percent, and more precisely less than about 30 weight percent of the dried adhesive.

In a further embodiment of the present invention, adhesion promoters, catalysts, or other materials with an affinity for bonding certain substrates are included in the adhesive formulation. As an example, in an embodiment of the present invention for bonding to polybutylene terephthalate, at least one of 4-(dimethylamino)pyridine (DMAP), or diphenyl carbonate are provided.

In embodiments of the present invention, the adhesive formulations are provided in a carrier fluid. The carrier fluid helps to disperse the active constituent materials and helps during application of the adhesive, i.e. sprayability, wettability, and the like. In one embodiment of the invention, water is provided as the carrier fluid. In another embodiment of the present invention, a glycol-ether or glycol-based carrier fluid, such as propylene glycol is provided. Since the grafted resins of the present invention are typically not water soluble, some additional modification may be necessary to disperse the grafted rein in water.

In another embodiment of the present invention, the adhesive is provided in a solvent based system. Non-limiting examples of suitable solvents include hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol-ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methyl caprolactone, for example, but also solvents such as N-methylpyrrolidone and N-methylcaprolactam, 1,2-propylene carbonate, methylene chloride, dimethyl sulphoxide, triethyl phosphate or any mixtures of such solvents. In a preferred embodiment of the present invention, the solvent-based adhesive formulation comprises xylene, methylethyl ketone, cyclohexanone or mixtures thereof as the primary carrier.

In another preferred embodiment of the present invention, the adhesive formulation is prepared to have about 30 to about 50 percent solids and about 50 to about 70 percent carrier fluid. In a most preferred embodiments of the present invention, the adhesive comprises about 40 percent solids.

In one embodiment of the invention, water is provided as the carrier fluid. In another embodiment of the present invention, a glycol-ether or glycol-based carrier fluid, such as propylene glycol is provided.

In one embodiment of the present invention, the adhesive is provided in an aqueous carrier with the optional inclusion of small amounts of co-solvent. In another embodiment of the present invention, the adhesive is provided in a solvent carrier system, though small amounts of water may be present in an emulsion or colloidal mixture.

In one embodiment of the present invention, the adhesive is provided as a "one part" or 1K formulation, wherein all the constituent materials are provided in a single mixture. In another embodiment, particularly where components may react with each other, for example when a catalyst is used, the constituents are separated into two parts, i.e. 2K. In this embodiment, typically the catalyst is separated from all of the other components, other than a carrier solvent. However, depending upon the reactivity, it may be advantageous to have other constituents in the part containing the catalyst.

In an embodiment of the present invention, the adhesives are applied to the rigid substrate through common application procedures such as spray application, brush application, or a dip process. The adhesive is preferably applied in a uniform wet film and hot air is employed to assist the drying and removal of the carrier fluid. The dry film thickness is targeted for about 0.20-1.0 mils or 5 to 25 microns.

Bonded assemblies are typically prepared using a compression or injection molding process. For compression molding, a mold having two separate cavities is employed. The rigid substrate having the dry adhesive film coating is placed in the preheated mold and the plastic/elastomer to be bonded is placed on top in the cavity. The hot mold is closed and placed in a hydraulic press and clamped under a known pressure. Once cured, the bonded assemblies are removed from the mold. Once the bonded assemblies cooled to room temperature they can be manually and visually tested for bond quality. Injection molding is similar, except the plastic/elastomer is injected into the mold cavity as a liquid and an elevated temperature and pressure are maintained until the assembly is cured and bonded.

In one embodiment of the present invention, the liquid injectable substrate comprises any polymeric material that can be heat softened and is appropriate for a compression or injection molding operation. Specific examples include polyamides (including, but not limited to, polyamide 6, polyamide 66, polyamide 11, polyamide 12, polyamide 6T, polyamide 6I, polyphthalamide), polyesters (including, but not limited to polyethylene terephthalate (PET), polybutylene terephthalate (PBT)), liquid crystalline polymer, polycarbonate (bisphenol A type), acrylonitrile-butadiene-styrene (ABS), PC/ABS blends, polyethersulfone (PES), polysulfone (PSU), polyphenyl sulfone (PPSU), polyetherimide (PEI), polyethertherketone (PEEK), polyaryletherketone (PAEK), thermoplastic elastomers such as styrene-ethylene-butylene-styrene (SEBS), polyphenylene sulfide (PPS).

In another embodiment of the present invention, the rigid substrate comprises any solid substrate that is not, or is minimally, deformed under heat and pressure such that it is appropriate for an injection or compression molding operation. Specific examples include aluminum, steel, stainless steel, glass, titanium, titanium nitride, magnesium, brass, nickel, ink-coated substrate, and an assortment of the plastics listed herein, such as nylon, polycarbonate, and ABS.

In an additional embodiment of the present invention, the curable adhesive is employed in a cord bonding application. Belts, tires and the like must be extremely cohesive and retain their tensile strength in use. They are made by embedding a cord within a rubbery polymer employing an adhesive to bond the cord to the elastomer. Typical cord materials comprise steel, polyester, polyamide (nylon), and the like, while typical rubbery elastomers comprise rubbers which are low in unsaturation like peroxide cured rubbers such as hydrogenated nitrile elastomers (HNBR). A preferred curable adhesive for cord bonding comprises a grafted phenoxy resin as described herein in conjunction with a blocked isocyanate and propylene carbonate in a cyclohexanone carrier.

Although the present invention has been described with reference to particular embodiments, it should be recognized that these embodiments are merely illustrative of the principles of the present invention. Those of ordinary skill in the art will appreciate that the compositions, apparatus and methods of the present invention may be constructed and implemented in other ways and embodiments. Accordingly, the description herein should not be read as limiting the present invention, as other embodiments also fall within the scope of the present invention as defined by the appended claims.

EXAMPLES

Throughout the examples, the adhesives were prepared, applied, bonded, and tested as described below, unless otherwise described in the individual example.

Adhesive Manufacture: As will be appreciated by one of skill in the art, some of the components need to be ground to a smaller particle size via bb mill, sandmill, or kady mill, while other components can be rolled in since they are in solution or already dispersed in water as received. The adhesives were prepared through typical mixing operations to produce a homogenous mixture according to the formulations below, and applied, bonded, cured as described below.

Adhesive Application: Typical application of the prepared adhesive is to spray apply the mixed adhesive to the rigid substrate and allowed to dry before the in-mold bonding step. Dry film thickness requirements will vary but typical dry film thickness is between 5 and 25 microns or 0.20-1.00 mils. To speed drying, the samples may be placed in an oven at 65° C. for 30 minutes.

Bonding/Curing: Bonding conditions can vary depending upon the particular processing characteristics of the non-rigid material (LSR) that is being bonded to the rigid substrate. In the present examples, the LSR samples are bonded in a mold with a temperature preset at 125° C. for high temperature LSRs and 65° C. for low temperature LSRs, and once the LSR is in the mold and closed under pressure a cure cycle of approximately 1 to 5 minutes is enough for cure and bonding to have taken place. Typical mold pressures range from 700 to 1200 PSI (4.83 MPa to 8.27 MPa).

Testing Parameters: Typically bond quality is tested in several manners, such as those outlined in ASTM 429B. Testing took place using an Instron®-type test apparatus where the rigid substrate is held in place with fixturing and the elastomer is peeled away from the substrate at an angle of 180 degrees at a speed of 12 inches/min. Typical pull force is 20-28 lbs and peak peel is typically 70-98N/cm. This method provides a value for the force needed to cause two materials to separate and again the failure mode is visually examined to determine the percentage of "rubber" (non-rigid substrate) that is left on the rigid substrate.

As outlined in the standard rubber bonding test method ASTM D 429, the terminology of the results as reported include: R=indicates failure of the rubber; RC=indicates failure at the rubber/rubber-primer interface; CP=indicates failure at the rubber-primer/substrate-adhesive interface; M=indicates failure at the substrate/substrate-adhesive interface. Mixed results will indicate the surface area percentage of failure as split between tow failure modes, for example 50% R, 50% RC indicates a failure mode where 50% of the rubber remains on the coupon, and 50% of the coupon is free of rubber, yet the substrate-adhesive remains on the coupon.

Example 1—Low Temperature LSR and the Role of Propylene Carbonate

| Constituent: 5555-1A: LOW TEMPERATURE FORMULA-A SIDE: (10:1, A/B) | Weight Percent |
|---|---|
| Phenoxy Resin (MMA/MAA grafted) | 17.24 |
| Propylene Carbonate | 28.19 |
| MEK | 54.57 |
| Total A | 100 |

| Constituent: 5555-2A: LOW TEMPERATURE FORMULA-A SIDE: No propylene carbonate (10:1, A/B) | Weight Percent |
|---|---|
| Phenoxy Resin (MMA/MAA grafted) | 17.24 |
| MEK | 82.76 |
| Total A | 100 |

| Constituent: 5555-1B: LOW TEMPERATURE B-SIDE: (10:1 A/B) | Weight Percent |
|---|---|
| Platinum Catalyst | 6.0 |
| Xylene | 94.0 |

| Constituent: 5555-2B: LOW TEMPERATURE B-SIDE: (10:1 A/B) | Weight Percent |
|---|---|
| Platinum Catalyst | 6.0 |
| Xylene | 94.0 |

The adhesives were spray applied to the rigid substrate (polycarbonate/SS), at a dry film thickness of about 10 microns, dried at 65° C. for 15 minutes and then placed in a mold and the LSR was injected and the assemblies cured for 5 minutes at 65° C. For LSR, this is considered to be a "low temp" cure.

The table below shows the grafted polymers ability to pick-up low temperature LSR stocks, and bond well to polycarbonate and stainless steel. The lack of bonding in propylene carbonate free adhesives also illustrates the importance of this material to good performance.

|  | Polycarbonate | | Stainless Steel | |
|---|---|---|---|---|
|  | 5555-1A/B | 5555-2A/B | 5555-1A/B | 55552-A/B |
| Low Temp LSR 1 | 100% | 0% | 98% | 0% |
| Low Temp LSR 2 | 100% | 0% | 85% | 0% |

Example 2—High Temperature LSR Resin Comparison

| Adhesive 2-1 | |
|---|---|

| Constituent: 5489-5: NEW POLYMER FORMULA (10:1, A/B) | Weight Percent |
|---|---|
| MDI-Uretdione | 2.0 |
| Phenoxy Resin (MMA/MAA grafted) | 12.7 |
| Propylene Carbonate | 5.0 |
| MEK | 9.5 |
| Cyclohexanone | 70.8 |
| Total A | 100 |

| Constituent: LORD E1009230B | Weight Percent |
|---|---|
| Platinum Catalyst | 7.2 |
| Xylene | 92.8 |

| Comparative 2-1 | |
|---|---|
| Constituent: LORD E1009395A: (10:1, A/B) | Weight Percent |
| MDI-Uretdione | 2.0 |
| Phenoxy Resin (ungrafted) | 12.7 |
| Propylene Carbonate | 5.0 |
| MEK | 9.5 |
| Cyclohexanone | 70.8 |
| Total A | 100 |

| Comparative 2-2 | |
|---|---|
| 5584-5 AQ 4:1 A/B | Weight Percent |
| MDI-Uretdione | 13.15 |
| Phenoxy Resin (modified water dispersed) | 11.72 |
| Dapro W-77 | 0.175 |
| Water | 75.0 |
| Total A | 100 |

| E1009129B B-side to AQ | Weight Percent |
|---|---|
| Platinum Catalyst | 0.2 |
| Propylene carbonate | 98.8 |

The adhesives were spray applied to the rigid substrate (either stainless steel or polycarbonate), at a dry film thickness of about 10 microns, dried at 65° C. for 15 minutes and then placed in a mold and the LSR was injected and the assemblies cured for 5 minutes at 125° C. For LSR, this is considered to be a "high temp" cure.

Testing the methacrylic acid grafted phenoxy resin against the ungrafted version in solvent and a modified phenoxy resin dispersed in water on four different LSR formulations in a very tough environmental test at 85° C. and 85% relative humidity. The results below illustrate that the new solvent formulation with the grafted polymer is superior to the ungrafted polymer and the water based versions.

| Primary Bonding-Rubber Retention | | | | | | |
|---|---|---|---|---|---|---|
| | Polycarbonate 121 | | | Stainless Steel 316 | | |
| | Ad 2-1 | Comp 2-1 | Comp 2-2 | Ad 2-1 | Comp 2-1 | Comp 2-2 |
| LSR 1 | 100 | 100 | 8 | 100 | 100 | 0 |
| LSR 2 | 100 | 100 | 95 | 100 | 100 | 100 |
| LSR 3 | 18 | 23 | 45 | 100 | 95 | 0 |
| LSR 4 | 100 | 100 | 90 | 100 | 100 | 60 |

| Rubber Retention after 7 days at 85° C./85% RH | | | | | | |
|---|---|---|---|---|---|---|
| | Polycarbonate 121 | | | Stainless Steel 316 | | |
| | Ad 2-1 | Comp 2-1 | Comp 2-2 | Ad 2-1 | Comp 2-1 | Comp 2-2 |
| LSR 1 | 85 | 10 | 20 | 100 | 0 | 0 |
| LSR 2 | 100 | 100 | 95 | 100 | 68 | 100 |
| LSR 3 | 0 | 13 | 80 | 100 | 0 | 0 |
| LSR 4 | 100 | 100 | 97 | 100 | 93 | 93 |

Example 3—Environmental 85° C./85% RH Testing with the Grafted Polymer Formula

This is a 14 day environmental test at 85° C./85% RH using the best performing iteration 5489-5* using multiple LSR formulations on polycarbonate and stainless steel. These tests show the superior performance of the adhesive containing methacrylic acid grafted phenoxy resin.

| Rubber Retention after 14 days at 85/85 | | |
|---|---|---|
| | Polycarbonate 121 | Stainless Steel 316 |
| LSR 1 | 100 | 100 |
| LSR 2 | 100 | 100 |
| LSR 3 | 5 | 100 |
| LSR 4 | 100 | 100 |

Example 4—Bonding Peroxide Cured Fluorosilicone

| Constituent: 19-5785C | Weight Percent |
|---|---|
| MDI-Uretdione | 2.44 |
| Phenoxy Resin (Grafted) | 39.94 |
| Bismaleimide (M-20) | 3.66 |
| Methylethyl ketone | 33.16 |
| Cyclohexanone | 20.8 |
| Total | 100 |

Formulation 5785C was prepared as described above and applied to zinc phosphatized steel at a dry film thickness of about 0.3 mils, then FVMQ was compression molded for 7 minutes at 175° C. The adhesive demonstrated 100% rubber retention of the fluorosilicone both with and without post-cure of the assembly, and having a primary adhesion peel strength of 26 N/cm.

Example 5 Alternate Monomers/Polymers for Grafting

In this example, adhesive formulations were prepared with different carboxylic acid and acrylic ester moieties grafted onto a variety of polymeric resins to demonstrate the various ways one can arrive at the functionalized polymers that are employed the embodiments of the present invention.

Once the particular functionalized polymer is prepared, it is incorporated into the formulation comprising an A side of 5555-1A of Example 1 with the functionalized polymer noted below in place of the MMA/MA grafted phenoxy, and a B side of E1009230B of Example 1, at a 10:3 ratio. The adhesive formulation were prepared and coated onto aluminum coupons, dried, then bonded in an injection molding operation to a 50 durometer liquid silicone rubber. The bonded coupons are then pull tested and the failure mode was measured as follows:

|  | CM | RC | R |
|---|---|---|---|
| Phenoxy (unmodified) | 100 | | |
| MMA/MA Bis-A Epoxy | | | 100 |
| PEA/MAA functionalized phenoxy | | 1 | 99 |
| 50/50 MAA/EA copolymer | | | 100 |
| MMA/HEMA functionalized phenoxy | | 1 | 99 |
| MCRM07/MAA functionalized phenoxy | | 1 | 99 |
| MMA/MA functionalized polyvinyl butyral | | 1 | 99 |

Example 6—Bonding PBT to Aluminum

Adhesives designated 5712-07 and 5712-17 were prepared according to the formulations below:

| Material | Functional Role | Weight Percent 5712-07 | Weight Percent 5712-17 |
|---|---|---|---|
| MMA/MAA grafted phenoxy resin | Film former and bonding resin | 15.0 | 13.0 |
| Benzoxazine | Bonding Resin (monomer) | 7.0 | 3.5 |
| DMAP | Catalyst | 0.75 | — |
| Hexamethoxymethyl-melamine-formaldehyde resin | Additional co-monomer | — | 3.5 |
| Amine salt of trifluoromethanesulfonic acid | Benzoxazine catalyst | 0.5 | — |
| Diphenyl Carbonate | PBT adhesion promoter | 1.75 | — |
| MEK | Carrier fluid | 47.5 | 41.17 |
| Propylene glycol methyl ether | Co-solvent | 27.5 | 19.41 |
| Dimethyl Carbonate | Co-solvent | — | 19.41 |
| | Total: | 100 | 100 |

The two systems were applied to aluminum coupons by spraying, followed by drying at 50° C., then B-staged outside the mold at 120° C./30 min for 5712-07 and at 150° C./30 min for 4512-17. The PBT was then injection molded to the coated aluminum coupon, followed by lap shear testing and observation of failure mode. The lap shear test result for both adhesive samples was 8.8 MPa. The failure mode of the two systems was plastic break.

Some applications require that the bond be a complete seal, i.e. air impermeable. A test was designed to determine whether the adhesive formed a complete seal. An aluminum coupon with a hole drilled in the middle was coated with a 1 mm wide bead of adhesive in a rectangle around the hole, then the coated coupon was placed in a mold and nylon was injection molded on the coupon to form a "sandwich" assembly. The bonded assembly was then placed in a small box filled with water on the nylon side and pressurized air on the aluminum side. The air side was charged with 7.5 psi compressed air for one minute, and the apparatus observed for bubbles on the water side indicating air was entering the hole in the aluminum and passing through the bonded portion of the coupon to the water side. The adhesives systems passed the sealing test in multiple trials.

Example 7—One Part Non-Platinum Adhesive Systems

In this example, a one-part adhesive containing a non-platinum catalyst is employed to bond a liquid silicone rubber to aluminum. The adhesive formulations in the table below were prepared and coated onto aluminum coupons.

| Constituent: 6927 | 3 | 4 | 5 |
|---|---|---|---|
| Phenoxy Resin (MMA/MA Grafted) | 18.3 | 17.43 | 20.49 |
| Propylene Carbonate | 18.3 | 17.43 | 8.78 |
| Polymethyl hydrosiloxane | 2.62 | 2.49 | 2.93 |
| ZnAcetylAcetonate | 0.262 | 0.75 | 0.293 |
| Methylethyl ketone | 60.4 | 61.9 | 67.507 |
| Total | 100.00 | 100.00 | 100.00 |

Once coated and dried, the adhesive-covered coupons were placed in an injection molding machine and cured at 160° C. for one minute. The results were as follows:

|  | Peel Strength (N/cm) | Rubber Retention (%) |
|---|---|---|
| 6927-3 | 85 | 100 |
| 6927-4 | 91 | 100 |
| 6927-5 | 84 | 100 |

What is claimed is:

1. A curable adhesive comprising a grafted phenoxy resin, an organic carbonate, and a solvent, wherein the grafted phenoxy resin comprises carboxylic acid and acrylate ester functionality.

2. The adhesive of claim 1, wherein the carboxylic acid functionality comprises a —COOH moiety.

3. The adhesive of claim 1, wherein the acrylate ester functionality comprises a —COOCH3 moiety.

4. The adhesive of claim 1, further comprising an isocyanate.

5. The adhesive of claim 4, wherein the isocyanate comprises a blocked isocyanate.

6. The adhesive of claim 5, wherein the blocked isocyanate comprises a MDI-uretdione.

7. The adhesive of claim 1, wherein the organic carbonate comprises propylene carbonate.

8. The adhesive of claim 1, further comprising a catalyst.

9. The adhesive of claim 8, provided in two parts wherein the grafted resin is provided in a first part separate from the catalyst in the second part.

10. The adhesive of claim 8, wherein the catalyst comprises a platinum catalyst.

11. The adhesive of claim 1, further comprising a maleimide compound.

12. The adhesive of claim 1 further comprising a metal acetylacetonate.

13. The adhesive of claim 12, wherein the metal acetylacetonate comprises zinc acetylacetonate.

14. The adhesive of claim 1, further comprising a hydride source.

15. The adhesive of claim 13, wherein the hydride source comprises polymethylhydrosiloxane.

16. The adhesive of claim 1, further comprising a benzoxazine resin and a catalyst for the benzoxazine resin.

17. The adhesive of claim 16, wherein the catalyst comprises an amine salt of trifluoromethanesulfonic acid.

18. The adhesive of claim 16, wherein the organic carbonate comprises diphenyl carbonate.

19. The adhesive of claim 16, disposed between a thermoplastic substrate and a metal substrate.

20. The adhesive of claim 19, wherein the thermoplastic substrate comprises polybutylene terephthalate and the metal substrate comprises aluminum.

21. The adhesive of claim 1, employed to bond a liquid-introduced substrate to a rigid substrate.

22. The adhesive of claim 21, wherein the liquid introduced substrate comprises liquid silicone rubber.

23. The adhesive of claim 22, wherein the liquid introduced substrate comprises a peroxide cured elastomer.

24. The adhesive of claim 23, wherein the peroxide cured elastomer comprises at least one of hydrogenated nitrile butadiene rubber (HNBR), ethylene propylene diene monomer rubber (EPDM), fluoroelastomers (FKM), or fluorosilicones (FVMQ).

25. The adhesive of claim 21, wherein the rigid substrate comprises at least one of stainless steel, aluminum, polycarbonate or polyamide.

26. The adhesive of claim 1, wherein the adhesive is free of any materials containing isocyanate functionality.

27. A bonded assembly comprising a liquid introduced substrate bonded to a rigid substrate with a curable adhesive of claim 1.

28. The bonded assembly of claim 27, wherein the liquid introduced substrate comprises a liquid silicone rubber, polybutylene terephthalate, a thermoplastic urethane, a castable urethane, or a peroxide cured elastomer.

29. The bonded assembly of claim 28, wherein the peroxide cured elastomer comprises at least one of hydrogenated nitrile butadiene rubber (HNBR), fluoroelastomers (FKM), or fluorosilicones (FVMQ).

30. The bonded assembly of claim 27, wherein the rigid substrate comprises at least one of polycarbonate, polyamide, stainless steel, or aluminum.

31. A method of bonding two dissimilar materials in an injection or compression molding process comprising:
    selecting a rigid substrate,
    selecting a liquid introduced substrate, and
    providing a curable adhesive comprising a grafted phenoxy resin, an organic carbonate, and a solvent, wherein the grafted phenoxy resin comprises carboxylic acid and acrylate ester functionality.

32. The method of claim 31, wherein the curable adhesive further comprises a maleimide compound.

33. The method of claim 31, wherein the curable adhesive further comprises a benzoxazine resin.

34. The method of claim 31, wherein the curable adhesive further comprises at least one of a blocked isocyanate, a catalyst, a maleimide compound, and a hydride source.

35. The method of claim 31, wherein the grafted phenoxy resin comprises at least one of a copolymer of bisphenol A and a Bisphenol A/F epoxy.

36. A method of preparing an adhesive comprising:
    reacting a phenoxy resin with at least one of methyl methacrylate, butyl acrylate, hydroxyl ethyl methacrylate, phenoxy ethyl acrylate, butyl acrylate, ethyl acrylate, hydroxyethyl acrylate, or mono-methacryloxypropyl terminated polydimethylsiloxane, and at least one of methacrylic acid, maleic anhydride, or itaconic acid, to produce a grafted phenoxy resin comprising carboxylic acid functionality and acrylate ester functionality, and
    mixing the grafted phenoxy resin with an organic carbonate and a solvent to produce an adhesive.

37. The method of claim 36, wherein the phenoxy resin comprises at least one of a copolymer of bisphenol A and a Bisphenol A/F epoxy.

38. The method of claim 36, wherein the adhesive further comprises a hydride source and a non-platinum containing catalyst.

39. The method of claim 36, wherein the hydride source comprises polymethylhydrosiloxane and the non-platinum catalyst comprises a zinc salt.

* * * * *